United States Patent [19]

Takahashi et al.

[11] Patent Number: 5,497,139
[45] Date of Patent: Mar. 5, 1996

[54] TEMPERATURE SENSOR AND ITS MANUFACTURING METHOD

[75] Inventors: Masayuki Takahashi, Sapporo; Hiroki Moriwake, Sanda; Yoko Sakoda, Osaka; Takuoki Hata, Moriguchi, all of Japan

[73] Assignee: Matsushita Electric Industrial Co., Ltd., Kadoma, Japan

[21] Appl. No.: 311,060

[22] Filed: Sep. 23, 1994

[51] Int. Cl.$^6$ ............................................. H01C 7/10
[52] U.S. Cl. .................. 338/22 SD; 252/519; 338/28; 29/612
[58] Field of Search ............... 338/22 R, 22 SD, 338/28; 29/612; 252/512, 518, 519, 520, 521; 264/61; 427/101; 437/918

[56] References Cited

U.S. PATENT DOCUMENTS

| | | |
|---|---|---|
| 3,958,209 | 5/1976 | Soda et al. |
| 3,962,145 | 6/1976 | Matsuo et al. ........................... 252/519 |
| 5,273,776 | 12/1993 | Yonezawa et al. ..................... 427/101 |

FOREIGN PATENT DOCUMENTS

| | | |
|---|---|---|
| 0017359 | 10/1980 | European Pat. Off. . |
| 56-23281 | 5/1981 | Japan . |
| 2143502 | 6/1990 | Japan . |
| 1474268 | 5/1977 | United Kingdom . |

Primary Examiner—Marvin M. Lateef
Attorney, Agent, or Firm—Willian Brinks Hofer Gilson & Lione

[57] ABSTRACT

A temperature sensor includes a thermistor in a heat-resistant cap and lead wires electrically connected to the thermistor. The thermistor is comprised of materials defined by the following chemical formula:

$$(Al_{1-x-y}Cr_xFe_y)_2O_3$$

wherein $0.05 \leq x+y \leq 0.95$, and $0.05 \leq y/(x+y) \leq 0.6$. The thermistor may also include CaO, rare earth oxide, $ThO_2$ or $ZrO_2$. The thermistor has an excellent long term resistance stability, which is important in high temperature applications of the temperature sensor, such as measurement of automobile catalytic converters temperature.

12 Claims, 1 Drawing Sheet

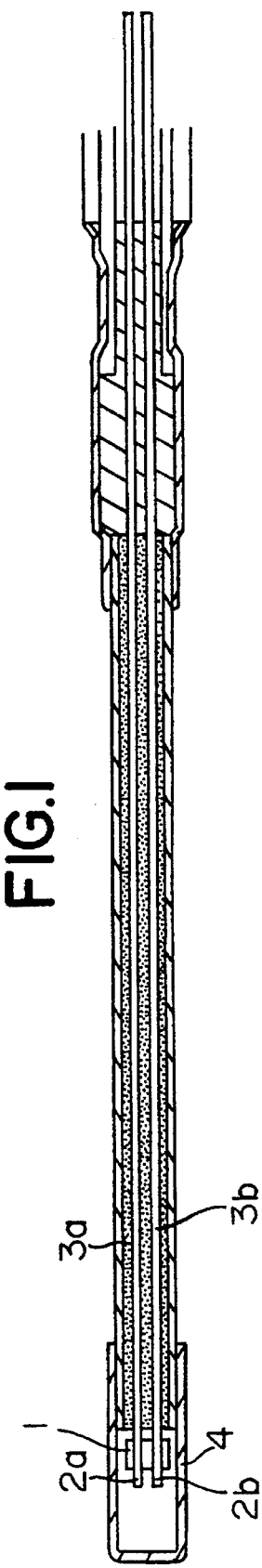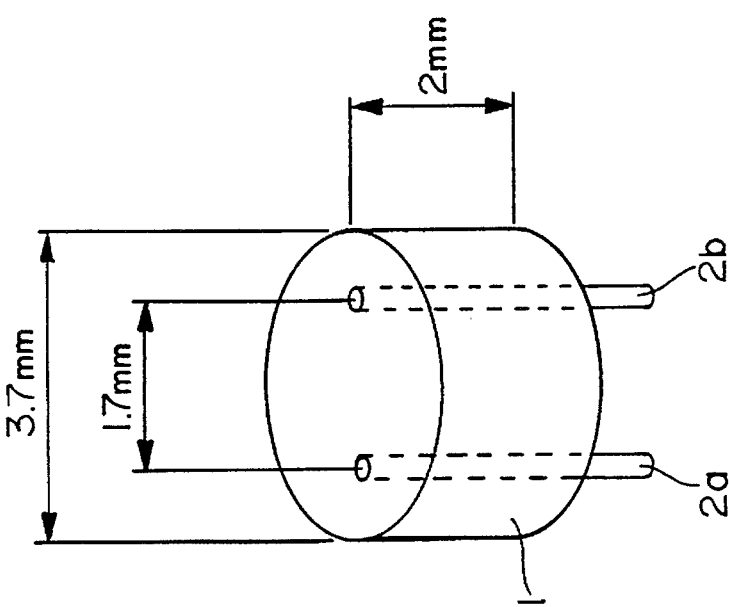

TEMPERATURE SENSOR AND ITS MANUFACTURING METHOD

FIELD OF THE INVENTION

This invention relates to a temperature sensor determining the temperature of a catalyst (or catalyzer) provided to process automobile exhaust gas.

BACKGROUND OF THE INVENTION

In order to solve the increasing environmental and the fuel economy problems caused by a huge number of automobiles, catalyzers for processing the automobile exhaust gas have been extensively installed therein. However, in order to obtain the maximum benefit of a catalyzer, its temperature has to be monitored exactly and constantly by using a temperature sensor having a long-term stability in the high temperature exhaust gas.

Defining the thermal characteristics of temperature sensor more specifically, a temperature sensor having a long-term resistivity change less than ±20% has to be employed in this case.

The material of a thermistor to be incorporated in the temperature sensor should be able to withstand the highest temperature of 1000° C. and it should be operable within a temperature range from 300° to 700° C. Therefore, a Mg(Al, Cr)$_2$O$_4$ system material has been developed and used. The term "thermistor" is also referred to herein as a "thermistor element".

FIG. 1 shows a cross-section of a conventional temperature sensor showing a thermistor element 1 mounted at its tip. This type of thermistor element 1 can be obtained by inserting platinum pipes or tubes 2a and 2b into the thermistor element 1 and by afterward sintering the thermistor element 1 at a high temperature.

Then, thus obtained thermistor element 1 is sealed in a heat resistant cap 4 constituting a catalyzer temperature sensor shown in FIG. 1. At this time, the platinum tubes 2a and 2b are welded to lead-tubes 3a and 3b in which lead-wires to connect the thermistor element 1 to a proper external device are disposed.

However, in the temperature sensor having the above construction, the metal atoms constituting the heat-resistant cap 4 tend to react with the oxygen atoms occluded in the cap 4. Therefore, in order to compensate the partial pressure of oxygen therein, oxygen has to be supplied from the thermistor element 1. Moreover, the reduction gases such as hydrogen and carbon monoxide gases generated in the cap 4, tend to combine with the oxygen gas in the thermistor element 1, changing the composition of the thermistor element 1.

Thus, as a result of this, the long-term thermistor resistance stability which should be kept within ±20% is lost, and the exact determination of the catalyzer temperature becomes impossible.

SUMMARY OF THE INVENTION

The objective of the present invention is to provide a temperature sensor including a thermistor made of a material of high long-term resistance stability, and to provide a manufacturing method for making the temperature sensor.

The inventive temperature sensor comprises a heat-resistant cap, a thermistor element disposed within said heat-resistant cap, and lead-wires bonded to said thermistor element for connecting said thermistor to an external circuit.

The thermistor element comprises a material defined by the chemical equation and composition range shown below:

$(Al_{1-x-y}Cr_xFe_y)_2O_3$    $0.05 \leq x+y \leq 0.95$, and $0.05 \leq y/(x+y) \leq 0.6$ Moreover, the thermistor element of the invention can also comprise a material defined by the chemical equation and composition range shown below:

$(Al_{1-x-y}Cr_xFe_y)_2O_3$+a-atomic % of CaO $0.05 \leq x+y \leq 0.95$, $0.05 \leq y/(x+y) \leq 0.6$, and $0.1 \leq a \leq 5$, wherein $(Al_{1-x-y}Cr_xFe_y)_2O_3 = 100$-atomic %.

Further, the thermistor element of the invention may be comprised of a material defined by the chemical equation and composition range shown below:

$(Al_{1-x-y}Cr_xFe_y)_2O_3$ +a-atomic % of a rare-earth oxide +b-atomic % of CaO $0.05 \leq x+y \leq 0.95$, $0.05 \leq y/(x+y) \leq 0.6$, $0.1 \leq a \leq 10$, and $0 \leq b \leq 5$, wherein $(Al_{1-x-y}Cr_xFe_y)_2O_3 = 100$-atomic %.

Moreover, the thermistor element may also be comprised of a material defined by the chemical equation and composition range shown below:

$(Al_{1-x-y}Cr_xFe_y)_2O_3$+a-atomic % of ThO$_2$+b-atomic % of CaO    $0.05 \leq x+y \leq 0.95$,    $0.05 \leq y/(x+y) \leq 0.6$, $0.01 \leq a \leq 10$, and $0 \leq b \leq 5$, wherein $(Al_{1-x-y}Cr_xFe_y)_2O_3 = 100$-atomic %.

Further, the thermistor element of the invented temperature sensor may be comprised of a material defined by the chemical equation and composition range shown below:

$(Al_{1-x-y}Cr_xFe_y)_2O_3$+a-atomic % of ZrO$_2$+b-atomic % of CaO $0.05 \leq x+y \leq 0.95$, $0.05 \leq y/(x+y) \leq 0.6$, $0.1 \leq a \leq 30$, and $0 \leq b \leq 5$, wherein $(Al_{1-x-y}Cr_xFe_y)_2O_3 = 100$-atomic %.

Moreover, the thermistor element of the invented temperature sensor, can be manufactured by mixing and molding any one of the materials defined by the chemical equations and compositions of the five-groups A to E shown below, and by sintering the thermistor element having attached to it electrodes and lead-wires. The mixing of the materials is preferably carried out in a substantially uniform manner.

The temperature sensor can then be obtained by inserting the sintered thermistor element in a heat-resistant cap, and installing wires to lead out.

Group A.   $(Al_{1-x-y}Cr_xFe_y)_2O_3$   $0.05 \leq x+y \leq 0.95$, and $0.05 \leq y/(x+y) \leq 0.6$ Group B.   $(Al_{1-x-y}Cr_xFe_y)_2O_3$+a-atomic % of CaO $0.05 \leq x+y \leq 0.95$, $0.05 \leq y/(x+y) \leq 0.6$, and $0.1 \leq a \leq 5$, wherein $(Al_{1-x-y}Cr_xFe_y)_2O_3 = 100$-atomic %.

Group C. $(Al_{1-x-y}Cr_xFe_y)_2O_3$+a-atomic % of a rare-earth oxide b-atomic % of CaO $0.05 \leq x+y \leq 0.95$, $0.05 \leq y/(x+y) \leq 0.6$, $0.1 \leq a \leq 10$, and $0 \leq b \leq 5$, wherein $(Al_{1-x-y}Cr_xFe_y)_2O_3 = 100$-atomic %.

Group D. $(Al_{1-x-y}Cr_xFe_y)_{2O3}$+a-atomic % of ThO$_2$+b-atomic % of CaO $0.05 \leq x+y \leq 0.95$, $0.05 \leq y/(x+y) \leq 0.6$ $0.01 \leq a \leq 10$, and $0 \leq b \leq 5$, wherein $(Al_{1-x-y}Cr_xFe_y)_2O_3 = 100$-atomic %.

Group E. $(Al_{1-x-y}Cr_xFe_y)_2O_3$+a-atomic % of ZrO$_2$+b-atomic % of CaO $0.05 \leq x+y \leq 0.95$ , $0.05 \leq y/(x+y) \leq 0.6$   $0.1 \leq a \leq 30$, and $0 \leq b \leq 5$, wherein $(Al_{1-x-y}Cr_xFe_y)_2O_3 = 100$-atomic %.

The features and advantages of the inventive temperature sensor are now briefly explained below.

According to the structures of thermistor elements of the inventive temperature sensor, they belong to a solid-solution comprised of a high-resistivity Al$_2$O$_3$ having a corundum structure, P-type Cr$_2$O$_3$ and N-type Fe$_2$O$_3$. In this case, the resistivity of P-type materials is increased by loosing its oxygen atoms, while the resistivity of N-type material is decreased by the same.

Therefore, the thermistor resistivity change can be minimized by mixing P-type and N-type materials. Accordingly, the electrical resistivity of the thermistor sensor can be stabilized for a long period even if oxygen atoms are lost from the thermistor element at high-temperature, making the exact catalyzer temperature measurement possible with the temperature sensor of the invention.

The invention itself, together with further objects and attendant advantages, will best be understood by reference to the following detailed description, taken in conjunction with the accompanying drawings.

BRIEF DESCRIPTION OF THE DRAWINGS

FIG. 1 shows a cross-section of a temperature sensor of an embodiment of the invention.

FIG. 2 shows a perspective view of a thermistor incorporated in the invented temperature sensor of FIG. 1.

DESCRIPTION OF PREFERRED EMBODIMENTS

Embodiments of the inventions will now be explained by referring to the attached drawings and tables.

The physical construction of the inventive temperature sensors shown in Figs. 1 and 2 is identical with the construction of a conventional sensor. Since the difference is substantially only in the constituting material, the relationships between the constituting materials and the thermistor characteristics are explained below.

Embodiment-1

As the starting materials, proper amounts of $Al_2O_3$, $Cr_2O_3$, and $Fe_2O_3$, are so measured and mixed to obtain the composition ratios x and y shown in Table 1 and Equation 1. Samples 1 to 27 shown in Table 1 are prepared by mixing the shown materials for 16 hours, for example, in a ball-mill, and pulverized for 18 hours after the materials are calcined at 1200° C.

After the powder of the materials is dried and mixed, a polyvinyl alcohol solution having a concentration of more than 10 weight % is added to an 8 weight % of the total sample. The sample is formed into granules which are molded in a form shown in FIG. 2. After inserting platinum tubes 2a and 2b, the mold is sintered at a temperature of 1600° C. and a thermistor element 1 is obtained. Samples 2 to 27 are prepared by using the same processes.

$(Al_{1-x-y}Cr_xFe_y)_2O_3$      (1), wherein x and y are the same as defined above.

According to the structure of a conventional temperature sensor, the obtained thermistor element 1 is disposed in a heat-resistant cap 4 in order to determine the thermistor resistances at temperatures of 300° C., 600° C., and 850° C. These resistances, expressed in terms of R 300, R600, and R850 are shown in Table 1.

The resistance of the elements at a temperature of 300° C. is measured after an endurance test conducted at 900° C. for 1000 hours in a sealed condition. Defining the percent of resistance change determined for the initial resistance as ΔR300, ΔR300 values are tabulated and are shown in Table 1.

The percent of resistance change of ΔR300 is obtained by using a formula A shown below.

(resistance after the sealed condition endurance test— initial resistance)/initial resistance ×100 (%)      (A)

TABLE I

| Sample No. | Composition | | Resistivity (kΩ) | | | R-change |
|---|---|---|---|---|---|---|
| | x | y | R300 | R600 | R850 | % ΔR300 |
| 1 | 0.85 | 0.1 | 0.24 | 0.038 | 0.014 | +11 |
| 2 | 0.6 | 0.35 | 1.32 | 0.280 | 0.110 | −8 |
| 3 | 0.7 | 0.1 | 1.50 | 0.150 | 0.042 | +7 |
| 4 | 0.4 | 0.4 | 0.87 | 0.174 | 0.071 | −10 |
| 5 | 0.7 | 0 | 38.10 | 3.330 | 1.200 | +37 |
| 6 | 0.65 | 0.05 | 55.00 | 2.300 | 0.650 | +18 |
| 7 | 0.5 | 0.2 | 5.47 | 0.247 | 0.100 | −2 |
| 8 | 0.3 | 0.4 | 0.15 | 0.035 | 0.015 | −13 |
| 9 | 0.5 | 0.1 | 316.7 | 5.870 | 1.150 | +6 |
| 10 | 0.4 | 0.2 | 1.10 | 0.160 | 0.070 | −4 |
| 11 | 0.3 | 0.3 | 0.10 | 0.028 | 0.011 | −12 |
| 12 | 0.24 | 0.36 | 0.075 | 0.024 | 0.012 | −18 |
| 13 | 0.4 | 0.1 | 619.50 | 3.100 | 1.800 | +9 |
| 14 | 0.3 | 0.2 | 0.58 | 0.110 | 0.055 | −6 |
| 15 | 0.2 | 0.3 | 0.022 | 0.009 | 0.006 | −15 |
| 16 | 0.15 | 0.35 | 0.17 | 0.008 | 0.004 | −18 |
| 17 | 0.34 | 0.06 | 725.0 | 2.32 | 0.100 | +12 |
| 18 | 0.3 | 0.1 | 31.42 | 2.900 | 1.000 | +3 |
| 19 | 0.2 | 0.2 | 0.70 | 0.130 | 0.053 | −7 |
| 20 | 0.1 | 0.3 | 0.55 | 0.130 | 0.070 | −30 |
| 21 | 0.285 | 0.015 | 10.00 | 1.100 | 0.320 | +17 |
| 22 | 0.2 | 0.1 | 830.0 | 33.290 | 5.590 | −3 |
| 23 | 0.15 | 0.15 | 8.70 | 1.380 | 0.500 | −10 |
| 24 | 0.15 | 0.05 | 73.50 | 7.390 | 2.070 | +9 |
| 25 | 0.2 | 0.1 | 950.0 | 38.100 | 6.400 | −1 |
| 26 | 0.025 | 0.025 | 1300.0 | 41.400 | 6.100 | −6 |
| 27 | 0.02 | 0.03 | 245.0 | 24.630 | 6.900 | −15 |

As proved by Sample 20 shown in Table 1, when the content of Fe is increased, the value of y/(x+y) is brought to more than a value of 0.6, so that the percent of resistance change is as large as −30%. The reason for this can be attributed to a transformation of $Fe_2O_3$ into $Fe_3O_4$ when it is placed in a high temperature reduction environment in which its oxygen atoms are lost, producing an imbalance between the P and N types. Moreover, an increase in Fe components may cause a crack in the ceramic element.

On the other hand, Sample 5 containing no Fe components, that is, containing no N-types materials shows a percent of resistance change as large as +37%.

Embodiment-2

A second embodiment of the invention is now explained below. As the starting material, proper amounts of $Al_2O_3$, $Cr_2O_3$, and $Fe_2O_3$ and $CACO_3$ are measured and mixed to obtain the composition ratios x, y, a as shown in Table 2 and Equation 2 in order to prepare Samples 28 to 39 shown in Table 2.

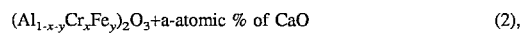

$(Al_{1-x-y}Cr_xFe_y)_2O_3$+a-atomic % of CaO      (2), wherein x, y and a are as defined above.

Samples 28 to 39 are prepared according to the processes employed in Embodiment 1, except that a sintering temperature of 1500° C. is employed.

The obtained thermistor elements are disposed in a heat-resistant cap 4 in order to determine the resistance at temperatures of 300° C. 600° C. and 850° C. These resistances expressed in terms of R300, R600, and R850 are shown in Table 2. Then, the resistances of the thermistor elements at a temperature of 300° C. are measured after an endurance test is conducted at 900° C. for 1000 hours in a sealed condition. The percents of resistances changes ΔR300 derived from formula (A), are also tabulated in Table 2.

TABLE 2

| Sample No. | Composition | | | Resistivity (k(Ω)) | | | Density ratio-1 | Density ratio-2 | R-change % ΔR300 |
|---|---|---|---|---|---|---|---|---|---|
| | x | y | a | R300 | R600 | R850 | | | |
| 28 | 0.85 | 0.1 | 5 | 0.22 | 0.035 | 0.013 | 98.3 | 92.8 | +7 |
| 29 | 0.7 | 0.1 | 3 | 1.450 | 0.144 | 0.038 | 97.5 | 93.2 | +6 |
| 30 | 0.65 | 0.05 | 5 | 45.0 | 1.900 | 0.330 | 97.8 | 90.0 | +11 |
| 31 | 0.5 | 0.1 | 2 | 25.7 | 5.170 | 0.590 | 98.2 | 93.5 | +9 |
| 32 | 0.3 | 0.2 | 0.5 | 0.56 | 0.107 | 0.051 | 97.8 | 96.2 | −8 |
| 33 | 0.3 | 0.1 | 2 | 3.10 | 2.850 | 0.980 | 97.9 | 97.2 | −2 |
| 34 | 0.285 | 0.015 | 1.0 | 9.70 | 1.060 | 0.312 | 96.1 | 91.8 | +13 |
| 35 | 0.2 | 0.1 | 0.5 | 91.0 | 40.00 | 7.070 | 96.4 | 95.7 | −3 |
| 36 | 0.16 | 0.24 | 1.0 | 12.30 | 1.870 | 0.750 | 97.2 | 96.7 | −18 |
| 37 | 0.025 | 0.025 | 0.1 | 1180.0 | 38.70 | 5.950 | 98.7 | 95.1 | −7 |
| 38 | 0.7 | 0.1 | 0.05 | 1.48 | 0.14 | 0.038 | 89.5 | 90.2 | +25 |
| 39 | 0.3 | 0.2 | 6 | 0.38 | 0.098 | 0.052 | 87.3 | 93.2 | −30 |

Since no solid-solution is formed between the main component of thermistor (i.e., the component defined by the formula $(Al_{1-x-y}Cr_xFe_y)_2O_3$) and the CaO component, the CaO component is segregated at the grain boundaries.

As proved by Sample 39 shown in Table 2, when the CaO component is added to a level exceeding 5 atomic %, a fair amount of CaO component is lost during the sintering process leaving a porous thermistor. Therefore, more of the oxygen is lost from the material, causing a long-term resistance change of more than 20%.

Furthermore, as proved by Sample 38 listed in Table 2, when the CaO component is added only to an amount less than 0.1 atomic percent, a sintering temperature lower by nearly 100° C. than that shown in Embodiment 1 has to be employed. Therefore, the density of the obtained sintered material is low and the percent of residence change is high. The theoretical densities ratios derived of the materials obtained when CaO component is added and not added, expressed by Density ratios 1 and 2, are tabulated in Table 2.

The theoretical density ratios are derived from the following formula, i.e., (material density)/(theoretical density)×100%.

The values of density ratio 2 listed in Table 2 are obtained with samples prepared for Embodiment 1 to which no CaO is added. As shown in Table 2, high-density thermistors can be obtained when a fair amount of CaO is added although a sintering temperature lower by nearly 100° C. is employed. Moreover, the addition of CaO is more effective to the materials containing more of the chromium element.

Embodiment-3

A third embodiment of the invention is now explained below. As the starting materials, proper amounts of $Al_2O_3$, $Cr_2O_3$, $Fe_2O_3$, $CaCO_3$, and oxides of rare-earth ($Y_2O_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$) are mixed to obtain the composition ratios x, y, a, b specified in Table 3 and Equation 3 shown below in order to prepare Samples 40 to 77.

$(Al_{1-x-y}Cr_xFe_y)_2O_3$+a-atomic % of rare-earth oxide +b-atomic % of CaO (3), wherein, x, y, a and b are the same as defined above.

These materials are processed under the previously shown conditions employed to prepare the thermistor samples of Embodiment 1. Then prepared samples are then sealed in a heat-resistant cap 4 in order to determine the resistances at high temperatures of 300° C. 600° C. and 900° C. These obtained resistances expressed in terms of R300, R600, and R900 are listed in Table 3. Then, the resistances of the elements at a temperature of 300° C. are measured after an endurance test at 1100° C. is conducted for 1000 hours in a sealed condition, and the percents of resistance change, ΔR300, derived from formula (A) are also tabulated in Table 3.

In Embodiment 3 of the invention, rare-earth oxide(s) and CaO are added to obtain high-density thermistor elements and to prevent the depletion of oxygen due to the occluded gas. The rare-earth oxide takes a form of $(RE)CrO_3$ of perovskite structure when it is segregated at the grain boundaries. In this case, the RE, i.e., a rare-earth element, and CaO are segregated independently at the grain boundaries without making a solid-solution with the major materials of the thermistor.

In the cases where the amount of the added rare-earth oxide is more than 10-atomic % such as the cases of Samples 42, 54, and shown in Table 3, the degree of $(RE)CrO_3$ segregation is increased, causing a fair amount of loss of Cr, loss of the balance of semiconductor characteristics, and resistance changes far exceeding ±20%.

TABLE 3

| Sample No. | Composition | | | | | Resistivity (kΩ) | | | R–change % ΔR300 |
|---|---|---|---|---|---|---|---|---|---|
| | x | y | a | RE | b | R300 | R600 | R900 | |
| 40 | 0.5 | 0.2 | 0.1 | Y | 0 | 5.15 | 0.27 | 0.053 | −3 |
| 41 | 0.3 | 0.1 | 5 | Y | 0.1 | 29.50 | 3.10 | 0.89 | +4 |
| 42 | 0.3 | 0.1 | 15 | Y | 0.1 | 25.70 | 2.85 | 0.68 | +45 |
| 43 | 0.4 | 0.2 | 2 | La | 0 | 1.10 | 0.175 | 0.06 | −2 |
| 44 | 0.2 | 0.1 | 8 | La | 0 | 790.0 | 34.73 | 6.14 | −4 |
| 45 | 0.85 | 0.1 | 10 | Ce | 3 | 0.19 | 0.038 | 0.016 | +7 |
| 46 | 0.2 | 0.2 | 3 | Ce | 0 | 0.64 | 0.135 | 0.056 | −8 |
| 47 | 0.2 | 0.2 | 0.05 | Ce | 0 | 0.63 | 0.128 | 0.053 | −30 |
| 48 | 0.4 | 0.1 | 7 | Pr | 0 | 543.2 | 6.020 | 0.495 | +8 |

TABLE 3-continued

| Sample | Composition | | | | | Resistivity (kΩ) | | | R-change |
|---|---|---|---|---|---|---|---|---|---|
| No. | x | y | a | RE | b | R300 | R600 | R900 | % ΔR300 |
| 49 | 0.025 | 0.025 | 0.5 | Pr | 0 | 1115.0 | 48.29 | 8.320 | −6 |
| 50 | 0.3 | 0.3 | 1 | Nd | 0 | 0.088 | 0.027 | 0.014 | −9 |
| 51 | 0.16 | 0.24 | 4 | Nd | 0 | 0.52 | 0.130 | 0.061 | −14 |
| 52 | 0.7 | 0.1 | 8 | Sm | 2 | 1.36 | 0.157 | 0.050 | +10 |
| 53 | 0.2 | 0.3 | 2 | Sm | 0 | 0.015 | 0.008 | 0.005 | −12 |
| 54 | 0.2 | 0.3 | 20 | Sm | 0 | 0.011 | 0.006 | 0.003 | −37 |
| 55 | 0.3 | 0.1 | 0.7 | Eu | 0 | 3.072 | 2.88 | 0.760 | +6 |
| 56 | 0.2 | 0.1 | 3.5 | Eu | 0 | 918.0 | 41.30 | 7.390 | −4 |
| 57 | 0.65 | 0.05 | 1.5 | Ru | 5 | 51.8 | 2.33 | 0.420 | +16 |
| 58 | 0.285 | 0.015 | 9 | Ru | 0 | 8.30 | 1.045 | 0.33 | +17 |
| 59 | 0.7 | 0.1 | 4 | Gd | 3 | 1,37 | 0.154 | 0.045 | +10 |
| 60 | 0.2 | 0.3 | 6 | Gd | 0 | 0.018 | 0.08 | 0.004 | −9 |
| 61 | 0.2 | 0.3 | 0.03 | Gd | 0 | 0.018 | 0.08 | 0.004 | −47 |
| 62 | 0.5 | 0.1 | 0.5 | Tb | 0 | 294.4 | 5.77 | 0.65 | +6 |
| 63 | 0.2 | 0.2 | 7.5 | Tb | 0 | 0.58 | 0.117 | 0.048 | −8 |
| 64 | 0.3 | 0.4 | 2.5 | Dy | 0 | 0.13 | 0.032 | 0.015 | −10 |
| 65 | 0.34 | 0.06 | 10 | Dy | 0 | 518.0 | 36.24 | 2.30 | +8 |
| 66 | 0.34 | 0.06 | 17 | Dy | 0 | 498.0 | 30.50 | 1.75 | +38 |
| 67 | 0.25 | 0.35 | 0.8 | Ho | 0 | 0.088 | 0.026 | 0.014 | −16 |
| 68 | 0.18 | 0.12 | 5.2 | Ho | 0 | 485.0 | 28.09 | 5.780 | −4 |
| 69 | 0.73 | 0.22 | 1.5 | Er | 2 | 0.85 | 0.155 | 0.06 | +7 |
| 70 | 0.25 | 0.15 | 7.3 | Er | 0 | 7.30 | 1.020 | 0.34 | +4 |
| 71 | 0.4 | 0.1 | 4 | Tm | 0.5 | 487.5 | 5.40 | 0.44 | +4 |
| 72 | 0.03 | 0.02 | 9 | Tm | 0 | 950.0 | 37.37 | 0.66 | −8 |
| 73 | 0.42 | 0.18 | 2.5 | Yb | 0 | 3.80 | 0.40 | 0.115 | +2 |
| 74 | 0.32 | 0.08 | 7 | Yb | 0 | 323.0 | 11.10 | 1.520 | +11 |
| 75 | 0.32 | 0.08 | 0.02 | Yb | 0 | 320.0 | 10.95 | 1.47 | +50 |
| 76 | 0.64 | 0.16 | 0.2 | Lu | 1 | 1.25 | 0.145 | 0.050 | +9 |
| 77 | 0.22 | 0.28 | 10 | Lu | 0 | 0.17 | 0.06 | 0.350 | −12 |

Then, in the cases where no CaO is added and the amount of added rare-earth oxide is less than 0.1-atomic %, such as the cases of Samples 47, 61, and 75 shown in Table 3, resistance changes far exceeding ±20% are produced.

Moreover, when the resistance changes observed after the sealed endurance test are compared with those obtained with Embodiments 1 and 2, the differences are very small, despite a testing temperature higher by nearly 200° C. than those employed in Embodiments 1 and 2. Thus, this proves a considerable increase of heat resistance.

Embodiment-4

A fourth embodiment of the invention is explained below.

As the starting materials, $Al_2O_3$, $Cr_2O_3$, $Fe_2O_3$, $CaCO_3$, and $ThO_2$ are mixed to obtain the composition ratios x, y, a, and b specified in Table 4 and Equation 4, and to prepare Samples 78 to 88.

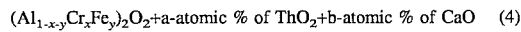

$(Al_{1-x-y}Cr_xFe_y)_2O_2$+a-atomic % of $ThO_2$+b-atomic % of CaO   (4)

wherein x, y, a and b are the same as defined above.

These thermistor materials are processed under the conditions employed in Embodiment 1. The samples are then sealed in a heat-resistant cap 4 in order to determine the respective resistances at temperatures of 300° C. 600° C. and 900° C. The measured resistances are expressed in terms of R300, R600, and R900 in Table 4.

Then, the resistances at a temperature of 300° C. are measured after an endurance test conducted at 1100° C. for 1000 hours in a sealed condition, and the percents of resistance change, ΔR300 are shown in Table 4 also.

In this embodiment of the invention, since both the added components of $ThO_2$ and CaO are segregated at the grain boundary without making solid-solutions with the major materials of thermistor and $ThO_2$ being stable in a reductive atmosphere, the effects obtained by rare-earth oxide can be obtained by adding $ThO_2$ for only one-tenth of the rare-earth oxide.

TABLE 4

| Sample | Composition | | | | Resistivity (kΩ) | | | R-change |
|---|---|---|---|---|---|---|---|---|
| No. | x | y | a | b | R300 | R600 | R900 | % ΔR300 |
| 78 | 0.6 | 0.35 | 2 | 0.5 | 1.150 | 0.245 | 0.098 | −11 |
| 79 | 0.4 | 0.4 | 3 | 0 | 0.750 | 0.152 | 0.035 | −8 |
| 80 | 0.5 | 0.2 | 0.01 | 0 | 5.400 | 0.220 | 0.095 | −3 |
| 81 | 0.4 | 0.2 | 0.5 | 0 | 1.040 | 0.148 | 0.064 | −6 |
| 82 | 0.4 | 0.2 | 12 | 0 | 2.780 | 0.180 | 0.100 | −25 |
| 83 | 0.4 | 0.1 | 0.2 | 2.5 | 59.50 | 2.970 | 1.620 | +4 |
| 84 | 0.2 | 0.2 | 10 | 0 | 0.52 | 0.110 | 0.047 | −13 |
| 85 | 0.2 | 0.2 | 0.005 | 0 | 0.70 | 0.130 | 0.050 | −36 |
| 86 | 0.285 | 0.015 | 5 | 5 | 7.80 | 2.12 | 0.38 | +12 |
| 87 | 0.15 | 0.05 | 7 | 2 | 62.0 | 6.20 | 1.500 | +10 |
| 88 | 0.02 | 0.03 | 0.7 | 0.7 | 238.0 | 24.00 | 6.450 | −12 |

However, when the amount of the added $ThO_2$ is more than 10 atomic %, such as the case of Sample 82 shown in Table 4, much of the sintering characteristics is lost, and resistance changes exceeding −20% are caused. Moreover, when no CaO is added and the amount of the added $ThO_2$ is less than 0.01 atomic % such as the case of Sample 85, a resistance change exceeding −20% is produced likewise.

On the other hand, however, the maximum operational temperature can be increased by about 200° C. similar to the embodiments where rare-earth is added.

Embodiment-5

A fifth embodiment of the invention is explained below.

As the starting materials, $Al_2O_3$, $Cr_2O_3$, $Fe_2O_3$, $CaCO_3$, and $ZrO_2$, are mixed to attain the composition ratios x, y, a, and b specified in Table 5 and Equation 5, and in this manner, Samples 89 to 101 are prepared

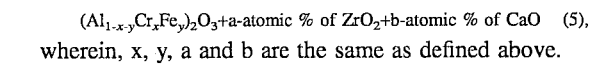

$(Al_{1-x-y}Cr_xFe_y)_2O_3$+a-atomic % of $ZrO_2$+b-atomic % of CaO   (5), wherein, x, y, a and b are the same as defined above.

TABLE 5

| Sample No. | Composition | | | | Resistivity (kΩ) | | | R-change |
|---|---|---|---|---|---|---|---|---|
| | x | y | a | b | R300 | R600 | R900 | % ΔR300 |
| 89 | 0.60 | 0.35 | 25 | 4 | 0.78 | 0.099 | 0.031 | −9 |
| 90 | 0.3 | 0.4 | 5 | 5 | 0.22 | 0.047 | 0.020 | −15 |
| 91 | 0.3 | 0.4 | 25 | 5 | 0.42 | 0.080 | 0.032 | −11 |
| 92 | 0.3 | 0.4 | 40 | 5 | 0.53 | 0.095 | 0.036 | −29 |
| 93 | 0.3 | 0.2 | 4.5 | 3.5 | 0.18 | 0.052 | 0.021 | −12 |
| 94 | 0.3 | 0.2 | 12.7 | 3.5 | 0.255 | 0.063 | 0.029 | −7 |
| 95 | 0.3 | 0.2 | 25.4 | 3.5 | 0.32 | 0.075 | 0.035 | −5 |
| 96 | 0.3 | 0.2 | 37.2 | 3.5 | 0.48 | 0.120 | 0.043 | −30 |
| 97 | 0.3 | 0.1 | 7.5 | 0.5 | 34.0 | 3.10 | 0.830 | +3 |
| 98 | 0.3 | 0.1 | 15 | 0.5 | 40.5 | 3.39 | 0.855 | +4 |
| 99 | 0.3 | 0.1 | 30.0 | 0.5 | 52.5 | 3.98 | 0.755 | +6 |
| 100 | 0.02 | 0.03 | 10 | 1 | 324.0 | 30.40 | 8.18 | −10 |
| 101 | 0.475 | 0.025 | 0.1 | 0 | 22.70 | 2.57 | 0.555 | +12 |

These thermistor materials are processed under the previously shown conditions employed in Embodiment 1. The samples are then sealed in a heat-resistant cap 4 in order to determine the respective resistances at temperatures of 300° C., 600° C. and 900° C. Table 5 shows these resistances expressed in terms of R 300, R600, and R 900. Then, the resistances of the elements at a temperature of 300° C. are measured after an endurance test conducted at 1100° C. for 1000 hours in a sealed condition, and the percent of resistance changes, ΔR300 are tabulated in Table 5 also.

In this embodiment of the invention, both the added components of $ZrO_2$ and CaO are independently segregated along the grain boundary without making solid-solutions with the major materials of thermistor.

However, when the amount of the added $ZrO_2$ is more than 30 - atomic %, such as the cases of Samples 92 and 96 shown in Table 5, much of the sintering characteristics is lost, and resistance changes exceeding −20% are produced. The maximum operational temperature can be increased by about 200° C., relative to the embodiments using rare-earth, similarly to the cases where $ThO_2$ is added.

Moreover, the thermistor resistivity can be controlled in a wide range by adjusting the amount of $ZrO_2$ keeping the major thermistor composition constant.

In all embodiments of the invention, the thermistor may comprise or consist essentially of the compositions defined by the chemical formulas of Equations 1–5.

The embodiments described above provide a number of significant advantages. The thermistor of the invention exhibits an excellent long term resistance stability, as evidenced by its resistance stability variation of not greater than ±20%. Moreover, in some embodiments, the stable resistance stability is maintained with thermistors of the invention operating for extended time periods at temperatures of 1100° C. Furthermore, in Embodiments 1 to 5, the thermistor materials can be molded not only in the form of a disk shown in FIG. 2, but can be glass molded or molded in other forms according to the purpose of use of the thermistor, yielding a high-performance thermistor to be incorporated in a temperature sensor.

The thermistor and the thermistor sensor incorporating the thermistor are made with available equipment. This eliminates the necessity of substantial new capital expenditures.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

We claim:
1. A temperature sensor comprised of:
a thermistor disposed in a heat-resistant cap and lead wires electrically connected to said thermistor in order to connect said thermistor to an external circuit wherein;
said thermistor is comprised of materials defined by the following chemical formula:

$$(Al_{1-x-y}Cr_xFe_y)_2O_3$$

wherein $0.05 \leq x+y \leq 0.95$, and $0.05 \leq y/(x+y) \leq 0.6$.

2. A temperature sensor according to claim 1, wherein: said thermistor sensor is comprised of materials defined by the following chemical formula:

$$(Al_{1-x-y}Cr_xFe_y)_2O_3 + \text{a-atomic \% of CAO}$$

wherein $0.05 \leq x+y \leq 0.95$, $0.05 \leq y/(x+y) \leq 0.6$, $0.1 \leq a \leq 5$, and wherein $(Al_{1-x-y}Cr_xFe_y)_2O_3 = 100$-atomic %.

3. A temperature sensor according to claim 1, wherein: said thermistor is comprised of materials defined by the following chemical formula:

$$(Al_{1-x-y}Cr_xFe_y)_2O_3 + \text{a-atomic \% of a rare-earth oxide} + \text{b-atomic \% of CaO}$$

wherein $0.05 \leq x+y \leq 0.95$, $0.05 \leq y/(x+y) \leq 0.6$, $0.1 \leq a \leq 10$, $0 \leq b \leq 5$; and
wherein $(Al_{1-x-y}Cr_xFe_y)_2O_3 = 100$-atomic %.

4. A temperature sensor according to claim 1, wherein: said thermistor is comprised of materials defined by the following chemical formula:

$$(Al_{1-x-y}Cr_xFe_y)_2O_3 + \text{a-atomic \% of ThO}_2 + \text{b-atomic \% of CaO}$$

wherein $0.05 \leq x+y \leq 0.95$, $0.05 \leq y/(x+y) \leq 0.6$, $0.01 \leq a \leq 10$, $0 \leq b \leq 5$, and
wherein $(Al_{1-x-y}Cr_xFe_y)_2O_3 = 100$-atomic %.

5. A temperature sensor according to claim 1, wherein: said thermistor is comprised of materials defined by the following chemical formula:

$$(Al_{1-x-y}Cr_xFe_y)_2O_3 = \text{a-atomic \% of ZrO}_2 + \text{b-atomic \% of CaO},$$

wherein $0.05 \leq x+y \leq 0.95$, $0.05 \leq y/(x+y) \leq 0.6$, $0.1 \leq a \leq 30$, $0 \leq b \leq 5$; and
wherein $(Al_{1-x-y}Cr_xFe_y)_2O_3 = 100$-atomic %.

6. A method for manufacturing a temperature sensor comprising the fabrication of a thermistor by a process of mixing of a material selected from the group consisting of:

A. $(Al_{1-x-y}Cr_xFe_y)_2O_3$, wherein $0.05 \leq x+y \leq 0.95$, and $0.05 \leq y/(x+y) \leq 0.6$;

B. $(Al_{1-x-y}Cr_xFe_y)_2O_3 + \text{a-atomic \% of CaO}$, wherein $0.05 \leq x+y \leq 0.95$, $0.05 \leq y/(x+y) \leq 0.6$, $0.1 \leq a \leq 5$, and wherein $(Al_{1-x-y}Cr_xFe_y)_2O_3 = 100$-atomic %;

C. $(Al_{1-x-y}Cr_xFe_y)_2O_3 + \text{a-atomic \% of rare-earth oxide} + \text{b-atomic \% of CaO}$, wherein $0.05 \leq x+y \leq 0.95$, $0.05 \leq y/(x+y) \leq 0.6$, $0.01 \leq a \leq 5$, $0 \leq b \leq 5$; and wherein $(Al_{1-x-y}Cr_xFe_y)_2O_3 = 100$-atomic %;

D. $(Al_{1-x-y}Cr_xFe_y)_2O_3 + \text{a-atomic \% of ThO}_2 + \text{b-atomic \% of CaO}$, wherein $0.05 \leq x+y \leq 0.95$, $0.05 \leq y/(x+y) \leq 0.6$, $0.01 \leq a \leq 10$, and $0 \leq b \leq 5$; and wherein $(Al_{1-x-y}Cr_xFe_y)_2O_3 = 100$-atomic %; and E. $(Al_{1-x-y}Cr_xFe_y)_2O_3 + \text{a-atomic \% of ZrO}_2 + \text{b-atomic \% of CaO}$, wherein $0.05 \leq x+y \leq 0.95$, $0.05 \leq y/(x+y) \leq 0.6$, $0.1 \leq a \leq 30$, $0 \leq b \leq 5$, and wherein $(Al_{1-x-y}Cr_xFe_y)_2O_3 = 100$-atomic %;

and subsequently molding said material into a molded shape, depositing electrodes, sintering, placing the resulting thermistor in a heat-resistant cap and connecting lead wires electrically to said thermistor so that said lead wires are lead out of said heat-resistant cap.

7. A thermistor comprised of a compound of the following chemical formula:

$$(Al_{1-x-y}Cr_xFe_y)_2O_3$$

wherein $0.05 \leq x+y \leq 0.95$, and $0.05 \leq y/(x+y) \leq 0.6$.

8. A thermistor comprised of a compound of the following chemical formula:

$$(Al_{1-x-y}Cr_xFe_y)_2O_3 + a\text{-atomic \% of CaO}$$

wherein $0.05 \leq x+y \leq 0.95$, $0.05 \leq y/(x+y) \leq 0.6$, $0.1 \leq a \leq 5$, and wherein $(Al_{1-x-y}Cr_xFe_y)_2O_3 = 100$-atomic %.

9. A thermistor comprised of a compound of the following chemical formula:

$$(Al_{1-x-y}Cr_xFe_y)_2O_3 + a\text{-atomic \% of a rare-earth oxide} + b\text{-atomic \% of CaO}$$

wherein $0.05 \leq x+y \leq 0.95$, $0.05 \leq y/(x+y) \leq 0.6$, $0.01 \leq a \leq 10$, $0 \leq b \leq 5$; and wherein $(Al_{1-x-y}Cr_xFe_y)_2O_3 = 100$-atomic %.

10. A thermistor comprised of a compound of the following chemical formula:

$$(Al_{1-x-y}Cr_xFe_y)_2O_3 + a\text{-atomic \% of ThO}_2 + b\text{-atomic \% of CaO}$$

wherein $0.05 \leq x+y \leq 0.95$, $0.05 \leq y/(x+y) \leq 0.6$, $0.01 \leq a \leq 10$, $0 \leq b \leq 5$, and wherein $(Al_{1-x-y}Cr_xFe_y)_2O_3 = 100$-atomic %.

11. A thermistor comprised of a compound of the following chemical formula:

$(Al_{1-x-y}Cr_xFe_y)_2O_3 + a$-atomic % of $ZrO_2 + b$-atomic % of CaO, wherein $0.05 \leq x+y \leq 0.95$, $0.05 \leq y/(x+y) \leq 0.6$, $0.1 \leq a \leq 30$, $0 \leq b \leq 5$; and wherein $(Al_{1-x-y}Cr_xFe_y)_2O_3 = 100$-atomic %.

12. A method of manufacturing a thermistor comprising:

(i) mixing a material selected from the group consisting of:

A. $(Al_{1-x-y}Cr_xFe_y)_2O_3$, wherein $0.05 \leq x+y \leq 0.95$, and $0.05 \leq y/(x+y) \leq 0.6$;

B. $(Al_{1-x-y}Cr_xFe_y)_2O_3 + a$-atomic % of CaO, wherein $0.05 \leq x+y \leq 0.95$, $0.05 \leq y/(x+y) \leq 0.6$, $0.1 \leq a \leq 5$, and wherein $(Al_{1-x-y}Cr_xFe_y)_2O_3 = 100$-atomic %;

C. $(Al_{1-x-y}Cr_xFe_y)_2O_3 + a$-atomic % of rare-earth oxide + b-atomic % of CaO, wherein $0.05 \leq x+y \leq 0.95$, $0.05 \leq y/(x+y) \leq 0.6$, $0.1 \leq a \leq 5$, $0 \leq b \leq 5$; and wherein $(Al_{1-x-y}Cr_xFe_y)_2O_3 = 100$-atomic %;

D. $(Al_{1-x-y}Cr_xFe_y)_2O_3 + a$-atomic % of $ThO_2 + b$-atomic % of CaO, wherein $0.05 \leq x+y \leq 0.95$, $0.05 \leq y/(x+y) \leq 0.6$, $0.01 \leq a \leq 10$, and $0 \leq b \leq 5$; and wherein $(Al_{1-x-y}Cr_xFe_y)_2O_3 = 100$-atomic %; and E. $(Al_{1-x-y}Cr_xFe_y)_2O_3 + a$-atomic % of $ZrO_2 + b$-atomic % of CaO, wherein $0.05 \leq x+y \leq 0.95$, $0.05 \leq y/(x+y) \leq 0.6$, $0.1 \leq a \leq 30$, $0 \leq b \leq 5$, and wherein $(Al_{1-x-y}Cr_xFe_y)_2O_3 = 100$-atomic %;

(ii) molding said material into a molded shape;

(iii) depositing electrodes into said molded shape; and (iv) sintering the molded shape.

* * * * *